Dec. 20, 1966 V. C. NASTEV 3,292,922
FLEXIBLE BAND CLAMPING DEVICE
Filed Jan. 13, 1965 3 Sheets-Sheet 1
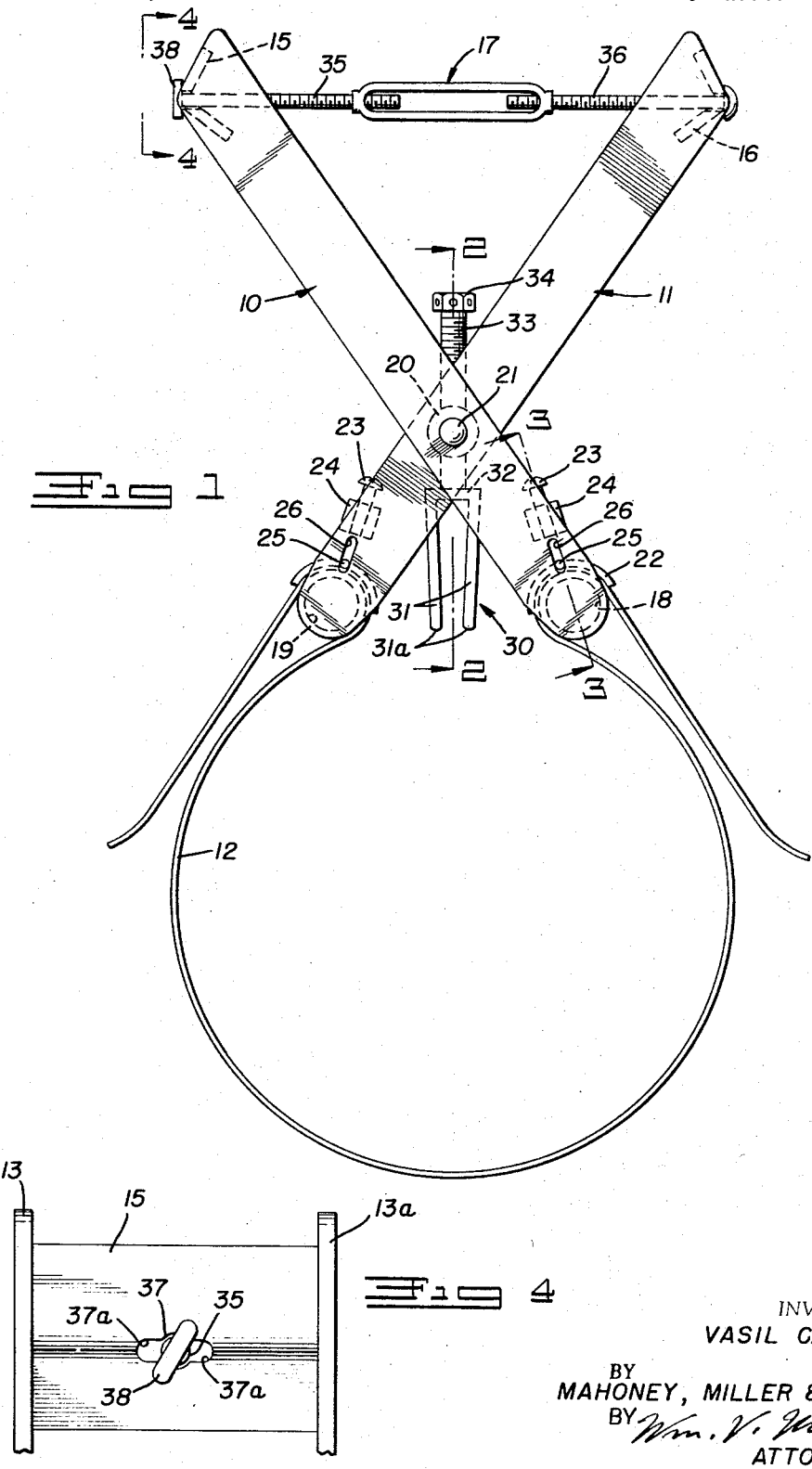
INVENTOR.
VASIL C. NASTEV
BY
MAHONEY, MILLER & RAMBO
BY
ATTORNEYS Dec. 20, 1966  V. C. NASTEV  3,292,922
FLEXIBLE BAND CLAMPING DEVICE
Filed Jan. 13, 1965  3 Sheets-Sheet 2
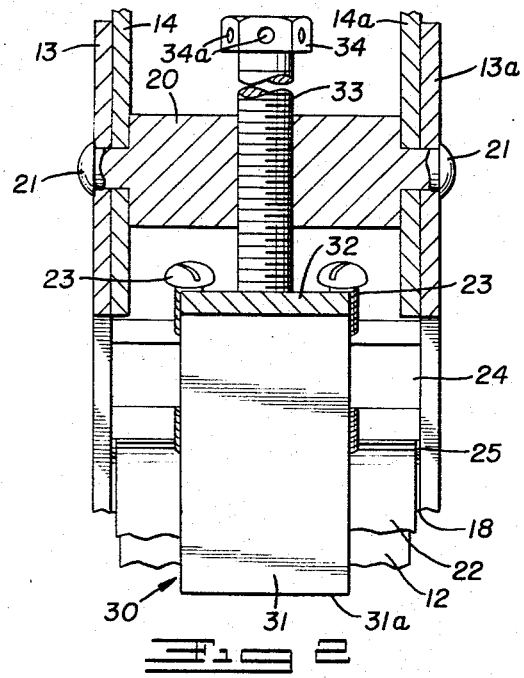
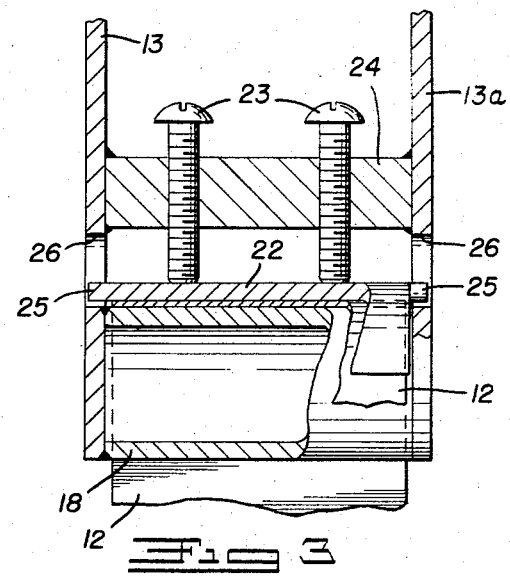
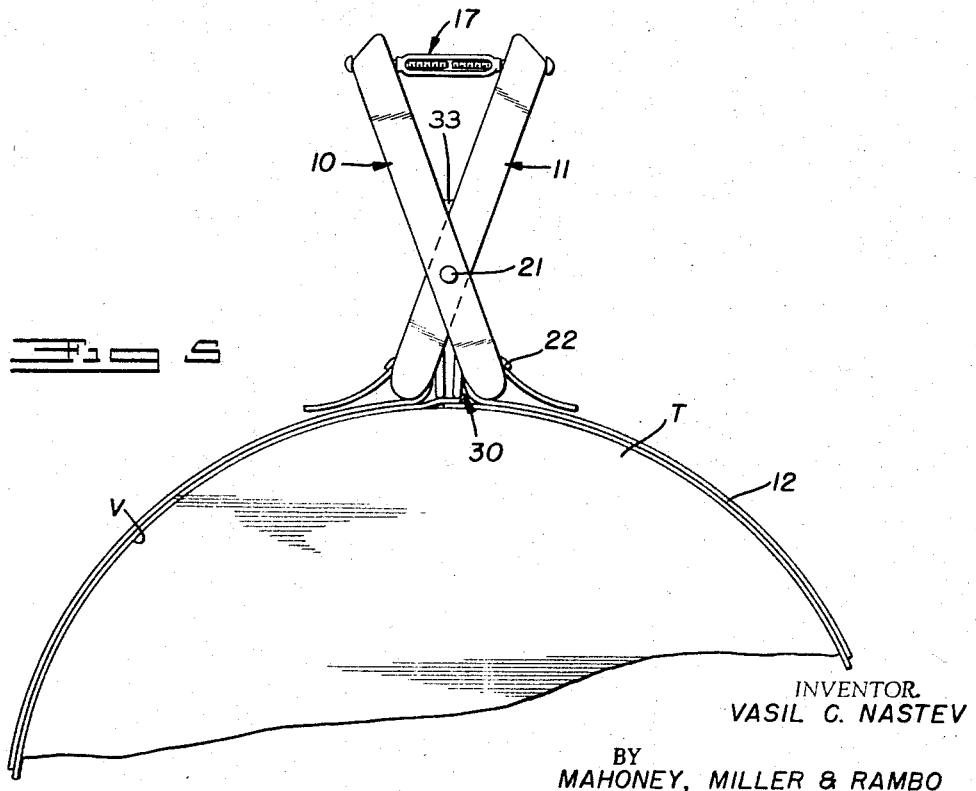
INVENTOR.
VASIL C. NASTEV
BY MAHONEY, MILLER & RAMBO
ATTORNEYS

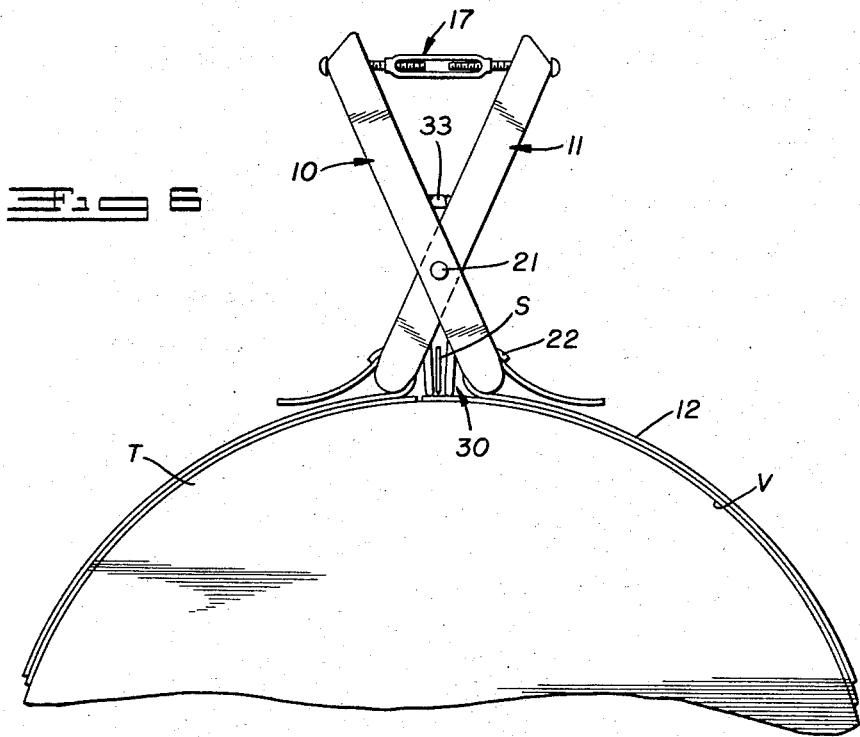
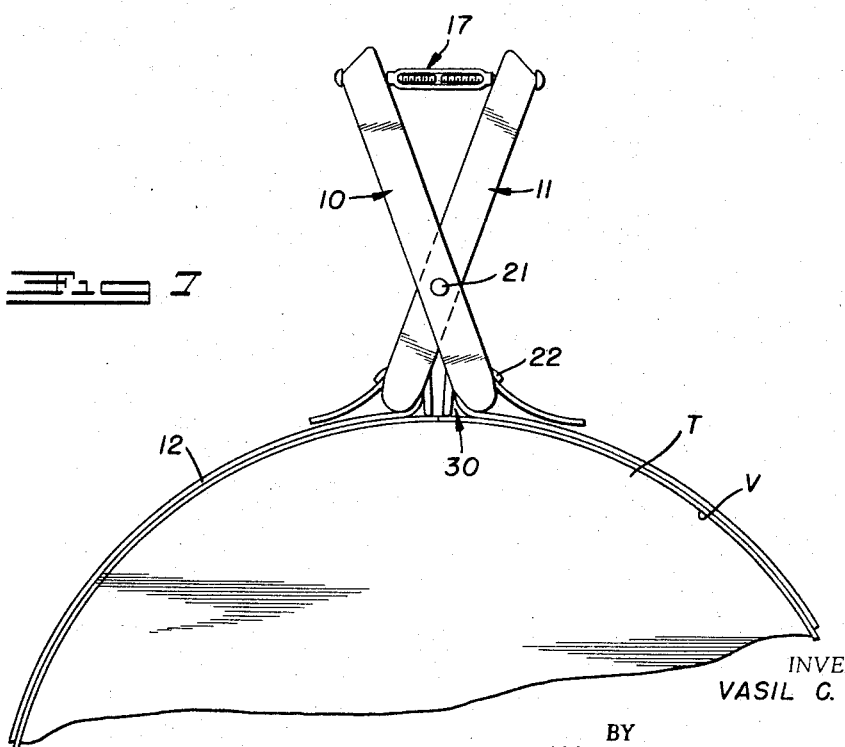

United States Patent Office 3,292,922
Patented Dec. 20, 1966

3,292,922
FLEXIBLE BAND CLAMPING DEVICE
Vasil C. Nastev, 1076 Geers Ave.,
Columbus, Ohio 43206
Filed Jan. 13, 1965, Ser. No. 425,244
9 Claims. (Cl. 269—131)

This invention relates, in general, to a clamping device. It relates, more specifically, to an improved clamping device of the flexible-band type of novel construction which facilitates the fitting and assembly of structural elements.

The clamping device embodying the present invention was primarily designed for application in furniture manufacturing although this specific application is not to be considered a limitation. Other advantageous instances of utilization will be readily apparent from an understanding of the construction thereof and operation in the furniture manufacturing application illustratively described hereinafter. As a particular instance of its utilization, a well known operation in furniture manufacturing consists of gluing an edging veneer to the peripheral edge of an article of furniture such as a table top. A typical table top comprises a body formed from either a laminated sheet wood panel or a number of individual boards assembled into a panel and presents a peripheral edge having an undesirable, unfinished appearance. This edge is generally concealed by a veneer strip which is attached by means of a suitable adhesive. The precise fitting and assembly of the veneer is a difficult operation with the prior art apparatus where the table top is of a circular or irregularly curved shape as the strip of veneer must be cut to an exact length and must be subjected to a uniformly distributed pressure during the time that the adhesive is setting. Although this may be conveniently accomplished by means of jigs and clamping apparatus specifically designed for a particular table top configuration, such apparatus is relatively costly and may only be economically utilized where a large number of identically shaped table tops are to be manufactured. Where a single table top, or a limited number, will be constructed, it has been necessary to utilize such prior art apparatus as was available to form cumbersome, composite clamping arrangements. In addition, the prior art apparatus is incapable of facilitating the precise cutting and fitting operation required.

It is, therefore, the primary object of this invention to provide a clamping device of the flexible-band type which is readily adaptable to any table top configuration to provide a substantially uniformly distributed clamping pressure and which may also be utilized to facilitate the fitting of the edging.

It is a further object of this invention to provide a flexible-band clamping device of rugged, economical construction and which is simple and easy to utilize.

It is another object of this invention to provide a flexible-band clamping device in which the flexible band may be selectively adjusted lengthwise for ready adaptation to a specific application.

It is also an object of this invention to provide a flexible-band clamping device having a pair of elongated lever arms which are pivotally assembled and are readily manipulated to provide the necessary clamping force.

These and other objects and advantages of this invention will be readily apparent from the following detailed description of an embodiment thereof and the accompanying drawings.

In the drawings:

FIGURE 1 is a plan view of a flexible-band clamping device embodying the present invention.

FIGURE 2 is a fragmentary sectional view taken along line 2—2 of FIGURE 1.

FIGURE 3 is a fragmentary sectional view taken along line 3—3 of FIGURE 1.

FIGURE 4 is a fragmentary side view of an end of a lever arm taken along the line 4—4 of FIGURE 1.

FIGURES 5, 6 and 7 are sequential, diagrammatic views showing the advantageous utilization of the device.

Having reference to the drawings, the illustrated embodiment of the flexible-band clamping device is seen to comprise a pair of elongated arms 10 and 11, which are pivotally connected to form levers, and an elongated flexible-band 12. Each arm, 10 and 11, is constructed from a pair of flat structurally rigid, metal bars, 13 and 13a, 14 and 14a, respectively, which are assembled in spaced parallel relationship. Adjacent ends of each pair of bars are rigidly interconnected by spacers which are secured to the respective bars by suitable means such as welding. The spacer at one end of each arm comprises a short section of an angle member, 15 and 16, which is preferably positioned as illustrated to provide the strongest possible support for tension-applying, connecting means 17. The spacer at the opposite end of each arm comprises a short section of a cylindrical bar, 18 and 19, of a diameter which will not produce an excessively sharp bend in the flexible band 12 as it is trained about the bar. If desired, the cylindrical bars 18 and 19 may be of tubular form to maintain the weight of the device at a minimum for ease of handling.

It will be noted with respect to FIGURE 2 that arm 11 is of a width to fit between the bars 13 and 13a of arm 10 in interleaved relationship. This construction permits each arm to be fully fabricated before assembly with a pivot pin 20. The pivot pin 20 extends transversely between the bars 14 and 14a with an axial projection 21 at each end thereof extending through aligned apertures formed in each of the bars 13, 13a, 14 and 14a. Thus, each arm 10 and 11 is journaled on the pivot pin for relative swinging movement. Preferably, the ends of each projection 21 are riveted to prevent spreading of the bars of each arm during use and thereby further increase the structural rigidity of the arms. The central portion of the pivot pin 20 is substantially larger than the projections 21 and forms a shoulder against which the bars 14 and 14a bear and prevents inward collapsing of the arms. Longitudinal location of the pivot, which is intermediate the ends of each arm, is determined by the leverage required for ease of operation and the associated relative movement of the end of the arms. In the illustrated embodiment, the pivot point is located closer to the ends of the arms to which the flexible band 12 is attached for the leverage advantage.

The flexible band 12 comprises an elongated strip of material having suitable strength and flexibility characteristics for the particular application. The maximum width of the band is limited by the spacing of the bars 14 and 14a of arm 11; however, a narrower band could be utilized if desired. It is contemplated that the arm 11 be constructed to accommodate a band having a maximum width of two inches as this size would be appropriate for most furniture manufacturing applications. It is apparent that the band width may be greater or less as deemed necessary for the particular application with the arms 10 and 11 also being appropriately dimensioned. The length of the flexible band 12 is determined by the dimensions of the articles which are to be clamped and several bands of varied lengths could be provided with each device for universal application. Providing several bands of varied lengths would prevent the necessity of utilizing a band of extreme length on small articles with the consequence of excessively long trailing ends which would tend to make operation of the device cumbersome.

The ends of each arm 10 and 11 are provided with clamping means for releasably engaging the flexible band 12 and maintaining the band in fixed relationship to the arms although the band could be permanently attached to one of the arms. In the present embodiment, the clamping means comprises a short section of a channel member 22 having an inner radius of curvature complementary to the exterior radius of curvature of a band trained around the respective cylindrical bar 18 or 19. Each channel 22 is supported for movement relative to its respective bar 18 or 19 for frictionally clamping the flexible band 12 therebetween. The force for effecting the clamping is provided by a pair of screws 23 which are threaded through a supporting bar 24 and bear against the surface of the channel 22. The supporting bar 24 extends transversely between the bars of the respective arm, 10 or 11, and is rigidly secured thereto, as by welding, in spaced relationship to the channel. Retention of each channel 22 between the bars of the respective arm while permitting the necessary reciprocable movement is effected by a pin and slot connection. Each end of a channel 22 is provided with an axially projecting pin 25 which extends through an elongated slot 26 formed in the respective bar. As is best shown in FIGURE 1, the slots 26, as well as the screws 23, are angularly displaced relative to the longitudinal axis of the arm, 10 or 11, to provide the most effective clamping force. In the operation of the clamping means, the screws 23 would first be backed off to permit separation of the channel 22 from the respective cylindrical bar, 18 or 19, to permit threading of the flexible band 12 therebetween. With the band 12 properly adjusted lengthwise for a specific application, the screws 23 would then be turned to force the channel 22 toward the respective bar, 18 or 19, and frictionally clamp the band therebetween.

In accordance with this invention, a pressure block 30 is provided to facilitate the fitting of the edging veneer and to provide a clamping force between the ends of the arms 10 and 11. The pressure block 30 comprises a U-shaped bracket having a pair of spaced apart plates 31 which are interconnected at one end by a web portion 32. The lengthwise dimension of the pressure block 30 is less than spacing between the bars 14 and 14a of arm 11 to permit positioning of the block substantially as shown in FIGURE 1 with the plates 31 transversely disposed. A clamping force is applied to the block by an adjusting screw 33 which is threaded through an opening formed in the enlarged central portion of the pivot pin 20. One end of the adjusting screw 33 is adapted to bear against the web portion 32 of the pressure block 30 and the screw is thus operative to effect a displacement of the block. Preferably, the screw 33 is not secured to the pressure block 30 to permit removal of the block when initially positioning the clamping device on the article. If necessary, a detent may be formed in the web portion 32 for cooperatively engaging the end of the screw 33 and thereby further stabilizing the operation. Turning of the screw 33 may be accomplished by means of a suitable wrench for engaging the hexagonally shaped head 34 or by a bar (not shown) which may be inserted in the holes 34a formed in the head.

The plates 31 of the pressure block terminate in edges 31a for contacting the surface of the article to be clamped. When the clamping device is positioned on the article and the arms 10 and 11 have been relatively swung to draw the band 12 tightly about the article, the pressure block 30 would be positioned between the arm as illustrated and the screw 33 manipulated to force the edges 31a of the plates into engagement with the article surface. Thus, the block 30 will provide a clamping force between the arms 10 and 11 for a substantially uniform pressure distribution around the article. In the present embodiment, the spacing of the plates 31 is such as to permit insertion of a saw-blade therebetween and to engage the opposed marginal edge portions of the abutting ends of an edging veneer as will be subsequently explained in detail.

Extending between the arms 10 and 11 at the ends opposite the attachment of the flexible band 12 is the tension-applying connecting means 17. The illustrated connecting means 17, see FIGURE 1, comprises a turnbuckle mechanism in which the threaded rods 35 and 36 are each connected to the respective arm, 10 or 11, by means of the angle members 15 and 16. The end of rod 36 projects through an aperture formed in the center of the angle member 16 and is provided with an integrally formed head. The aperture formed in the angle member 16 is of a size to accommodate the movement of the rod 36 during the pivoting of the arms. An aperture 37 is formed in the angle member 15 for receiving the rod 35; however, the aperture and the head 38 formed on the end of this rod are formed to provide a cooperative key locking mechanism (see FIGURE 4). This permits the rod 35 to be readily disconnected from the angle member 15 and thereby facilitate the manipulation of the device during a clamping operation. The aperture 37 comprises a central, circular hole having diametrically opposed slots 37a which extend along the juncture of the legs of the angle member and open to the central circular hole. The head 38 of the rod is of elongated bar form and shaped to pass through the aperture 37 when aligned with the slots 37a and to prevent passage when disposed transversely thereto. During a clamping operation, the head 38 would be positioned transversely and the central circular hole would form a locking detent because of the relatively sloped legs of the angle member 15.

A typical clamping operation in conjunction with the attachment of an edging veneer V to a table top T is sequentially illustrated in FIGURES 5–7. The edging veneer V is initially cut to the approximate desired length but sufficiently long to permit overlapping of the marginal end portions as shown in FIGURE 5. Assuming that the flexible band 12 has been attached to the arms 10 and 11 to have a suitable length for the specific application, the rod 35 of the connecting means 17 may be disengaged from the arm 10 as previously described and the device may then be positioned around the table top T as indicated. During the initial positioning, the pressure block 30 would have been removed to further facilitate the positioning. Subsequent to the initial positioning, the arms 10 and 11 would be manually swung toward each other and the rod 35 interlocked with the angle member 15 of arm 10. Further clamping action may then be readily accomplished through manipulation of the turnbuckle to draw the arms together. After the flexible band 12 has been drawn tightly about the edging veneer V and is properly positioned, the pressure block 30 is positioned between the arms and the adjusting screw 33 is turned to force the edges 31a of the plates against the edging veneer V. With the edging veneer V thus clamped to the table top T, the overlapped marginal end portion of the veneer may be accurately marked for cutting for a precise fit.

After marking the veneer V, the turnbuckle may be backed off slightly to loosen the flexible band 12 and permit the overlapped marginal end portion of the veneer to slide off the underlying end to permit cutting of the veneer. This is diagrammatically illustrated in FIGURE 6 where a saw-blade S is shown inserted between the plates 31 of the pressure block 30.

Upon completion of the cutting operation, the clamping device is retightened to draw the band 12 and accurately position the edging veneer V. At the time of initially positioning the edging veneer V, a layer of suitable adhesive would be applied to the contacting surfaces of the table top T and the veneer to eliminate any additional steps in the operation. As shown in FIGURE 7, the clamping device has been retightened to hold the edging veneer V in position during the setting of the adhesive. If necessary, the pressure block 30 may also be readjusted to provide the proper clamping pressure to the marginal end portion of the edging veneer. It will be noted by reference to FIGURE 7, that the length of the flexible band is preferably adjusted to permit drawing the ends of the arms 10 and 11 close to the pressure block 30 when the device is completely tightened.

Although a single application of the clamping device of this invention has been illustrated, it will be readily apparent that the device may be readily utilized in numerous, diversified clamping operations. The article being clamped may have an irregularly curved surface to which the flexible band 12 will readily conform rather than the illustrated circular shape. Versatility of the clamping device may be further increased by the use of simply constructed bearing blocks as in the case of sharp cornered objects. The construction and use of such bearing blocks are well known and it is not considered necessary to illustrate and describe them in detail.

It is readily apparent that this invention provides a novel clamping device which greatly facilitates the clamping and fitting of irregularly shaped articles. The clamping device provides a substantially uniform clamping pressure about the periphery of the article and is simple and easy to utilize. The device is of simple, rugged construction and may be economically manufactured.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A flexible-band clamping device comprising a pair of elongated arms assembled in crossed relationship, pivot means connecting said arms intermediate their ends and supporting said arms in assembled relationship for relative swinging movement, connecting means extending between said arms at one end thereof and selectively operable to maintain said arms in relatively fixed relationship and apply a tension force thereto, and an elongated, flexible band attachable to said arms at the opposite end thereof and adapted to form an article encircling loop which may be constricted by relative swinging movement of said arms toward a longitudinally aligned position.

2. A flexible-band clamping device according to claim 1 which includes a pressure block formed with a pair of spaced apart plates positionable between said arms and longitudinally displaceable relative to said arms into contacting engagement with an article encircled by said flexible band, and adjusting means carried by said pivot means and being engageable with said block for effecting displacement of said block.

3. A flexible-band clamping device according to claim 2 wherein said adjusting means comprises an elongated screw assembled in threaded engagement with said pivot means and in engagement with said block and adjustable longitudinally relative to said arms.

4. A flexible-band clamping device according to claim 1 wherein said flexible band is adjustably attachable to at least one of said arms for lengthwise adjustment.

5. A flexible-band clamping device according to claim 1 in which at least one of said arms includes means adjustably engageable with said flexible band to permit selective lengthwise adjustment thereof.

6. A flexible-band clamping device according to claim 1 wherein said connecting means comprises a telescopically adjustable tension member extending between said arms with each end of said member being connected to a respective one of said arms, one of said ends being detachably connected with the respective arm.

7. A flexible-band clamping device comprising a pair of elongated, rigid arms assembled in interleaved relationship with each of said arms having a pair of spaced parallel bars secured in relatively fixed relationship, pivot means connecting with and maintaining said arms in assembled relationship for relative swinging movement, said pivot means having a pin extending transversely between said bars, connecting means extending between and connected with said arms at one end thereof and being selectively operable to apply a tension force thereto, an elongated, flexible band extending between and connected to the opposite ends of said arms and forming an article encircling loop whereby relative swinging movement of said arms toward a longitudinally aligned relationship will effect a constriction of said loop, a pressure block having a pair of spaced apart plates formed with article engaging edge portions and being selectively positionable between the end portions of said arms connected with said flexible band, and an adjusting screw threaded through said pivot pin with an end thereof adapted to engage said pressure block and being operable to displace said block longitudinally relative to said arms.

8. A flexible-band clamping device according to claim 7 wherein at least one of said arms includes gripping means adapted to releasably engage said flexible band for selective lengthwise adjustment thereof.

9. A flexible-band clamping device according to claim 7 wherein said connecting means includes a turnbuckle having one shaft thereof formed with a key-locking end portion and one of said arms having a key-slot formed therein for releasably interlocking with said shaft.

References Cited by the Examiner

UNITED STATES PATENTS

| | | | |
|---|---|---|---|
| 1,071,457 | 8/1913 | Old | 269—131 |
| 2,394,630 | 2/1946 | Mitchell | 269—131 |
| 2,998,629 | 9/1961 | Smith | 269—131 |

RICHARD H. EANES, Jr., *Primary Examiner.*